(12) United States Patent
Meixner

(10) Patent No.: US 8,176,774 B2
(45) Date of Patent: May 15, 2012

(54) PROCESS AND DEVICE FOR TESTING THE MOBILITY OF A NEGATIVE PRESSURE RELIEF VALVE OF THE FUEL SYSTEM OF A MOTOR VEHICLE

(75) Inventor: Siegfried Meixner, Hitzhofen (DE)

(73) Assignee: Audi AG, Ingolstadt (DE)

( * ) Notice: Subject to any disclaimer, the term of this patent is extended or adjusted under 35 U.S.C. 154(b) by 306 days.

(21) Appl. No.: 12/061,501

(22) Filed: Apr. 2, 2008

(65) Prior Publication Data
US 2009/0211348 A1 Aug. 27, 2009

(30) Foreign Application Priority Data
Apr. 4, 2007 (DE) .......................... 10 2007 016 217

(51) Int. Cl.
*G01M 15/09* (2006.01)
(52) U.S. Cl. ..................................... 73/114.39
(58) Field of Classification Search ............... 73/114.38, 73/114.39, 114.43
See application file for complete search history.

(56) References Cited

U.S. PATENT DOCUMENTS

| | | | |
|---|---|---|---|
| 5,150,689 A | 9/1992 | Yano et al. | |
| 5,284,050 A * | 2/1994 | Iida et al. | 73/114.39 |
| 6,176,118 B1 * | 1/2001 | Kidokoro et al. | 73/40 |
| 6,327,901 B1 * | 12/2001 | Dawson et al. | 73/114.39 |
| 2001/0025525 A1 | 10/2001 | Isobe et al. | |
| 2002/0066440 A1 * | 6/2002 | Kano et al. | 123/520 |
| 2004/0089062 A1 * | 5/2004 | Matsubara et al. | 73/118.1 |
| 2004/0173011 A1 * | 9/2004 | Nakoji | 73/118.1 |
| 2006/0059980 A1 * | 3/2006 | Matsubara et al. | 73/118.1 |
| 2006/0162433 A1 * | 7/2006 | Matsubara et al. | 73/118.1 |
| 2006/0179928 A1 * | 8/2006 | Shikama et al. | 73/118.1 |

FOREIGN PATENT DOCUMENTS

| | | |
|---|---|---|
| DE | 197 02 584 A1 | 7/1997 |
| DE | 197 55 401 A1 | 7/1998 |
| DE | 101 01 257 A1 | 7/2001 |
| DE | 101 36 183 A1 | 2/2003 |
| DE | 10 2004 040 706 A1 | 3/2006 |
| EP | 1 760 303 A1 | 3/2007 |

* cited by examiner

*Primary Examiner* — Eric S McCall
(74) *Attorney, Agent, or Firm* — Novak Druce + Quigg LLP

(57) ABSTRACT

The invention relates to a method for testing the mobility of the negative pressure relief valve of the fuel system of a motor vehicle, the negative pressure relief valve depending on the pressure within the fuel system having to be moved between a closed position which closes the fuel system and an open position which clears the fuel system, with the following steps: a) Testing the position of the negative pressure relief valve; and b) Testing the position of the negative pressure relief valve in reaction to a pressure increase within the fuel system if the negative pressure relief valve in step a) was in the closed position. The invention furthermore relates to a system for testing the mobility of the negative pressure relief valve of the fuel system of a motor vehicle.

12 Claims, 2 Drawing Sheets

PROCESS AND DEVICE FOR TESTING THE MOBILITY OF A NEGATIVE PRESSURE RELIEF VALVE OF THE FUEL SYSTEM OF A MOTOR VEHICLE

CROSS-REFERENCE TO RELATED APPLICATIONS

This application claims priority from German Patent Application No. 10 2007 016 217.2 filed Apr. 4, 2007.

SPECIFICATION

The invention relates to a process and a device for testing the mobility of the negative pressure relief valve of the fuel system of a motor vehicle.

BACKGROUND OF THE INVENTION

Negative pressure relief valves of this type, which are located within the fuel system, move into the closed position and seal the fuel system against the exterior when there is a negative pressure within the fuel system. A negative pressure arises especially during standing phases of the vehicle since the fuel system and the fuel contained in it cool off. If the negative pressure relief valve also remains in the open position over a longer time interval, the presence of a leak within the fuel system can be deduced. When the fuel system is intact, the existing negative pressure, however, acts on it over a comparatively long time interval so that the negative pressure switch remains in the closed position for a correspondingly long time interval. In this instance, it can happen that the negative pressure switch locks in the closed position and no longer moves into the open position even when the pressure rises. Since a blocked negative pressure switch is no longer suitable for the detection of leaks, its mobility must be ensured by regular testing. A process which is suitable for this purpose and a corresponding device can be taken as known from U.S. Pat. No. 6,327,901 B1. The negative pressure within the fuel system there is first reduced by operating a valve and then it is checked whether the negative pressure switch has moved into the open position. When the negative pressure switch successfully moves into the open position within a defined time interval, the valve is closed again and the fuel system is exposed to a negative pressure. Then it is checked whether the negative pressure relief valve is moving into the closed position within a further time interval. If the negative pressure switch successfully passes all tests, this is evaluated as an indication of its mobility.

The circumstance that the process and the device intended for its implementation are made comparatively expensive and complex and thus lead to increased production costs can be regarded as disadvantageous.

The object of this invention is therefore to devise a process and a device for testing the mobility of the negative pressure relief valve of the fuel system of a motor vehicle which can be implemented more easily and economically.

SUMMARY OF THE INVENTION

According to the invention, the process for testing the mobility of the negative pressure relief valve of the fuel system of a motor vehicle comprises the following steps a.) Testing the position of the negative pressure relief valve and b.) Testing the position of the negative pressure relief valve in reaction to a pressure increase within the fuel system if the negative pressure relief valve in step a.) was in the closed position. Since an intact negative pressure relief valve should move out of the closed into the open position in reaction to a pressure increase, in contrast to the prior art, the fundamental mobility of the negative pressure relief valve therefore can be carried out as required, using the process according to the invention very easily and economically and any locking of the negative pressure relief valve in the closed position can be reliably diagnosed. If it is established in step a.) that the negative pressure relief valve is already in the open position, of course it is no longer necessary to carry out step b.).

In one advantageous embodiment of the invention it is provided that it is additionally checked in step b.) whether a process of fueling the fuel system which causes a pressure increase has taken place. During fueling of the fuel system normally a slight overpressure is formed so that when there is a fueling process, a pressure increase within the fuel system can be assumed. If the test furthermore indicates that a fueling process has taken place, but that the overpressure valve remains in the closed position, an adverse effect on operation of the negative pressure relief valve can be deduced especially easily.

In this connection it has been shown to be advantageous that the fueling process be tested with consideration of the measured temperature values of the fuel tank of the fuel system over time and/or the measured charging values of the activated charcoal filter canister of the fuel system over time and/or the time the vehicle is stopped. Since aside from pressure, the temperature of the fuel and of the fuel tank also changes during fueling, the fueling process can be identified, for example, using measured temperature values over time. Furthermore the degree of charging of the activated charcoal canister of the fuel system changes during fueling so that the fueling process can also be carried out using its measured charging values over time. Other advantages can be achieved by considering the time the vehicle is stopped. The time stopped can be determined, for example, using the time difference between locking and opening the vehicle doors of the stopped vehicle. Alternatively, the determination of a time difference between the "ignition off" and "ignition on" event is conceivable. It can likewise be provided that the presence of a fueling process can be checked using a switch element located in the region of the filler neck or with consideration of the measured fill level values of the fuel tank.

In another advantageous embodiment of the invention, it is provided that prior to step (b) in another step another valve, in particular the activated charcoal filter valve of the fuel system, is opened and a pressure increase is effected. This constitutes an especially simple and economical possibility for testing the position of the negative pressure relief valve in reaction to a pressure increase within the fuel system, since fuel systems ordinarily comprise switchable valves by design. By opening the other valve, the negative pressure prevailing within the fuel system is decreased and the negative pressure relief valve should be moved into the open position. A negative pressure switch which locks in the closed position can accordingly be reliably detected.

In this connection it has been shown to be advantageous that the other valve is only opened when the negative pressure relief valve has been in the closed position at least during a predetermined time interval. This ensures that within the fuel system a negative pressure has been able to form and there is essentially the risk that the negative pressure relief valve locks in the closed position. Furthermore, increased wear of the other valve by unnecessary switching or opening is avoided.

In another advantageous embodiment of the invention it is provided that testing of the mobility of the negative pressure relief valve is started when a control device of the vehicle is activated. Since activation of the control device allows the incipient starting of the engine, and thus of a generator or the like of the vehicle, to be deduced, the process according to the invention is carried out with little power consumption without unwanted draining of the battery of the vehicle.

Another aspect of the invention relates to a device for testing the mobility of the negative pressure relief valve of the fuel system of a motor vehicle, the negative pressure relief valve depending on the pressure within the fuel system having to be moved between a closed position which closes the fuel system and an open position which clears the fuel system, its comprising a first testing means by which the position of the negative pressure relief valve is to be checked and a second testing means by which the position of the negative pressure relief valve in reaction to a pressure increase within the fuel system is to be checked. The advantages of the device according to the invention can be learned from the preceding description of the advantages of the process.

Other advantages, features and details of the invention will become apparent from the following description of preferred embodiments and using the drawings in which identical elements or elements with the same function are provided with identical reference numerals.

DETAILED DESCRIPTION OF THE PREFERRED EMBODIMENT OF THE INVENTION

Figure 1:
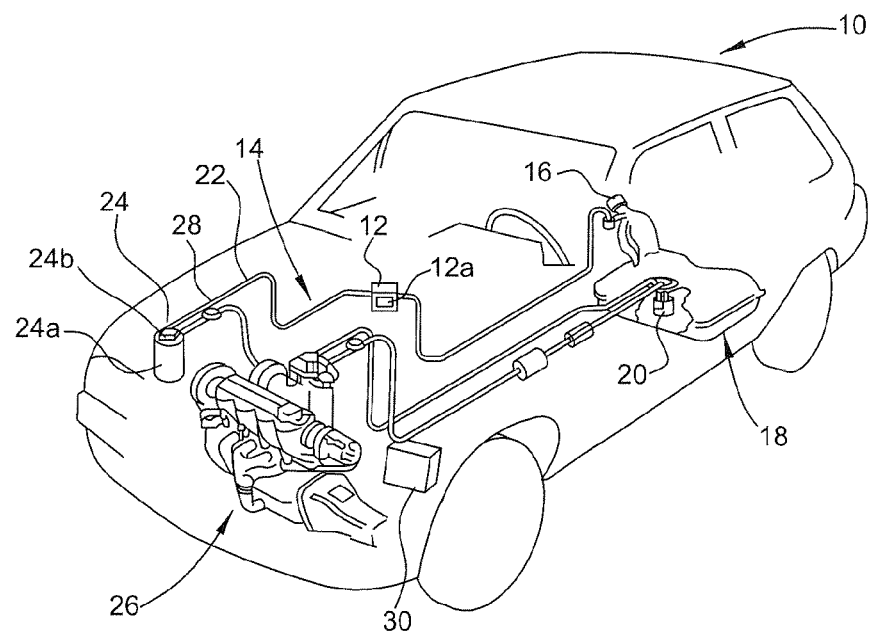
FIG. 1 shows a schematic and partially cutaway perspective view of a motor vehicle equipped with one embodiment of the device for testing the mobility of the negative pressure relief valve of the fuel system.

FIG. 1 shows a schematic and partially cutaway perspective view of a motor vehicle 10 which is equipped with one embodiment of the device for testing the mobility of the negative pressure relief valve 12 of the fuel system 14. The fuel systems 14 comprises in addition to other components a fuel tank 18 which can be filled with fuel via the filler neck 16. In the region of the fuel tank 18 there is a determination means 20 which is made as a temperature sensor, which is coupled to the bus system (not shown) of the vehicle 10, and by means of which measured temperature values of the fuel tank 18 and the fuel located therein can be determined and sent to a control device 30 which is coupled to the bus system. The fuel vapor above the fuel is routed via a ventilation line 22 to a tank 24 which normally contains an absorbing material such as an activated charcoal filter (AKF) 24a. The AKF 24a stores the fuel as its degree of charging increases. Since the AKF 24a has a limited capacity, between it and the fuel supply of the engine 26 of the vehicle 10 there is an activated charcoal filter valve 28 (AKF valve) which is likewise connected to the bus system of the vehicle 10 and which can be actuated by means of the control device 30. By opening the AKF valve 28, the fuel which has been temporarily stored in the AKF 24a is routed into the engine 26 to be burned and the AKF 24a is thus regenerated and the degree of its charging can be reduced. To determine the degree of charging, the canister 24 is assigned a determination means 24b which is likewise coupled to the control device 30 via the bus system. To test the position of the negative pressure relief valve 12, it is assigned a testing means 12a which is made here as a switch element and which can likewise communicate via the bus system of the vehicle 10 with other components and the control device 30 of the vehicle 10. The position of the negative pressure relief valve 12 can be detected, for example, in a Boolean variable, and 0 can represent the open position and 1 the closed position. But alternative detection and representation methods are also conceivable.

Figure 2:
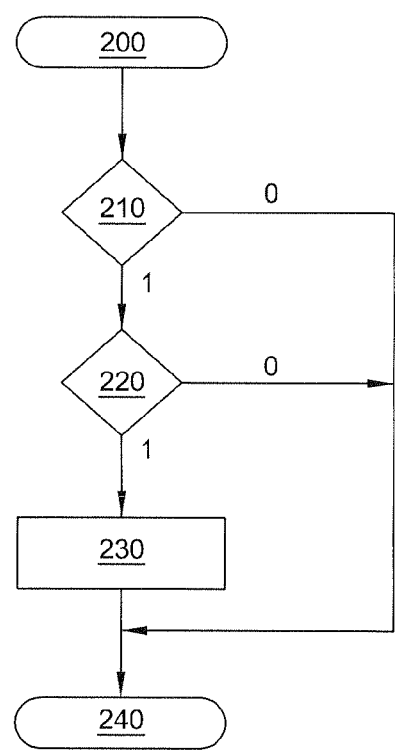
FIG. 2 shows a schematic flow chart of a first embodiment of the process for testing the mobility of the negative pressure relief valve of the fuel system of the motor vehicle as shown in FIG. 1.

FIG. 2 shows a schematic flow chart of a first embodiment of the process for testing the mobility of the negative pressure relief valve 12 of the fuel system 14 of the vehicle 10 as shown in FIG. 1. The process is started in a first process step 200 when the control device 30 is activated. Activation of the control device 30 can be relayed depending on the respective configuration of the vehicle 10, for example, by an "ignition on" signal, a wake-up signal of a vehicle door contact (not shown) or the like. In the following process step 210 it is first tested whether the negative pressure relief valve 12 is in the closed position 1. If it is in the open position 0, locking in the closed position 1 can be precluded and it is possible to jump directly to the end 240 of the process. If the negative pressure relief valve 12 is in the closed position 1, in the next process step 220 it is tested whether the negative pressure relief valve 12 in reaction to a process of fueling the vehicle 10 which causes a pressure increase continues to be in the closed position 1. The presence of a fueling process is tested using the control device 30 with consideration of the measured temperature values of the determination means 20 over time, the measured charging values of the determination means 24b over time, and the stopped time of the vehicle 10 which is accessible to the control device 30. If the negative pressure relief valve 20 in reaction to the pressure increase is in the open position 0, in turn there is a jump to the end 240 of the process. If, however, the negative pressure relief valve 12 continues to be in the closed position 1, in step 230 an assigned error code is produced. This error code can be stored, for example, in an error memory (not shown) and can be read out when the vehicle 10 is being serviced. It can likewise be provided that when locking of the negative pressure relief valve 20 is ascertained, alternatively or additionally a corresponding optical or acoustic warning indication takes place.

Figure 3:
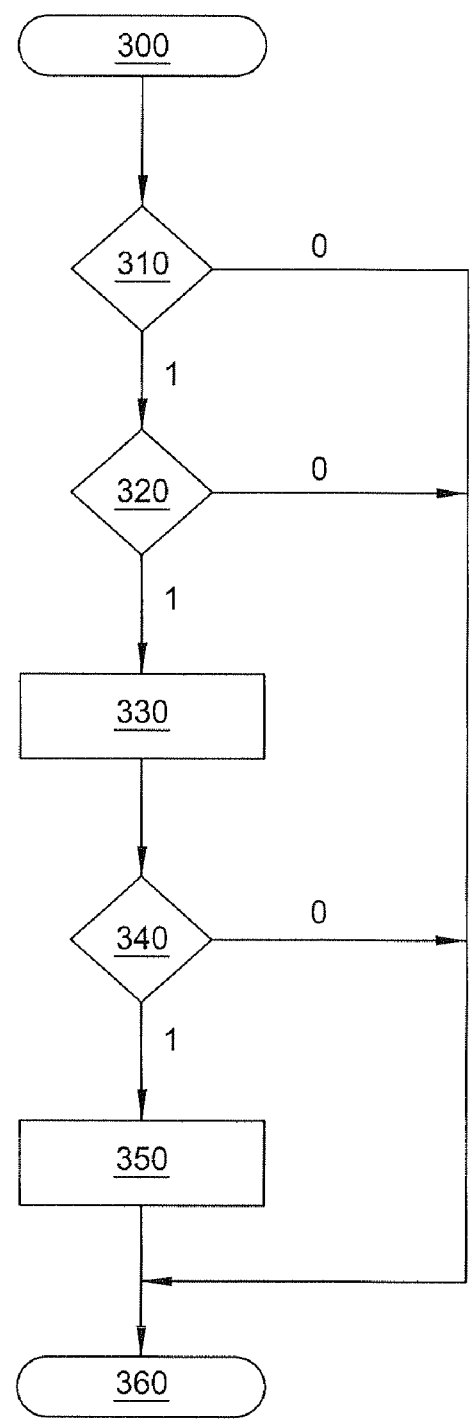
FIG. 3 shows a schematic flow chart of a second embodiment of the process for testing the mobility of the negative pressure relief valve of the fuel system of a motor vehicle as shown in FIG. 1.

FIG. 3 shows a schematic flow chart of a second embodiment of the process for testing the mobility of the negative pressure relief valve 12 of the fuel system 14 of the vehicle 10 as shown in FIG. 1. Here, starting 300 of the process takes place depending on the activation signal of the control device 30. In the following process step 310 it is first checked whether the negative pressure relief valve 12 is in the closed position 1. If it is already in the open position 0, the process jumps to the end 360. If it is in the closed position 1, in the next process step 320 it is checked whether it has been in the closed position 1 for at least a predetermined time interval. If not (0), the process is in turn interrupted by a jump to the end 360 to the next process pass. Here it should be emphasized that process steps 310 and 320 can of course also be executed in the reverse sequence. If the required minimum time interval is reached or exceeded (1), opening the AKF valve 28 (process step 330) causes a pressure increase and the negative pressure prevailing within the fuel system 14 is reduced accordingly. Then, it is checked in process step 340 whether the negative pressure relief valve 12 in reaction to a pressure increase continues to be in the closed position 1. If at this point it is in the open position 0 and accordingly is not blocked, the process jumps directly to the end 360. If it is still in the closed position 1, in step 350 as in the previous example a corresponding error code is generated before the process is finally terminated in step 360 until the next pass.

The invention claimed is:

1. A method for determining the operativeness of a negative relief valve of the fuel system of a motor vehicle comprising:
    applying pressure to the fuel system;
    probing the negative relief valve while the system is under pressure to determine whether the negative relief valve opens; and
    probing an activated charcoal filter valve of said system to determine whether said filter valve is open, causing a pressure increase in said system, prior to applying pressure to said system upon detecting said relief valve to be in the closed position and probing said relief valve while said system is under pressure to determine if it opens.

2. The method according to claim 1 including opening said filter valve only upon said relief valve having been closed at least during a predetermined time interval.

3. The method according to claim 1 including initiating probing said relief valve to determine whether it is in the closed or open condition upon activation of a control device of said vehicle.

4. The method according to claim 1 including probing to determine a fueling of said system during the second mentioned probing of said negative relief valve, causing a pressure increase in said system.

5. The method according to claim 4, further comprising considering measured temperature values of said fuel system over time.

6. The method according to claim 4, further comprising considering measured charging values of an activated charcoal canister of said system, over time.

7. The method according to claim 4, further comprising considering a time said vehicle is stopped.

8. A system for determining the operativeness of a negative relief valve of a fuel system of a motor vehicle comprising:
    means for probing the valve to determine whether it is in the closed or open condition;
    means for applying pressure to the fuel system upon detecting the valve to be in the closed condition;
    means for probing the valve while the fuel system is under pressure to determine whether the valve opens; and
    means for probing an activated charcoal filter valve of said system to determine whether said filter valve is open, causing a pressure increase in said system, prior to applying pressure to said system upon detecting said relief valve to be in the closed position and probing said relief valve while said system is under pressure to determine if it opens.

9. A device according to claim 8 wherein said first and second mentioned means for probing said negative pressure relief valve constitutes a unitary member.

10. A device according to claim 8 including means for controlling a pressure increase in said fuel system.

11. A device according to claim 8 including means for detecting a pressure increase caused by a fueling of said system.

12. A device according to claim 11 wherein said means for detecting a pressure increase caused by a fueling of said system, is functional to determine at least one of the measured temperature value of said fuel system over time, the measured charging values of an activated charcoal filter canister over time, and the time the vehicle is stopped.

* * * * *